US 9,810,105 B2

(12) United States Patent
Martyn et al.

(10) Patent No.: US 9,810,105 B2
(45) Date of Patent: Nov. 7, 2017

(54) SYSTEM AND METHOD FOR CAMSHAFT VIBRATION CONTROL

(71) Applicant: General Electric Company, Schenectady, NY (US)

(72) Inventors: James Hugo Martyn, Innsbruck (AT); Christian Rauch, Munich (DE); Sandro Rivellini, Innsbruck (AT)

(73) Assignee: General Electric Company, Schenectady, NY (US)

( * ) Notice: Subject to any disclaimer, the term of this patent is extended or adjusted under 35 U.S.C. 154(b) by 63 days.

(21) Appl. No.: 14/882,198

(22) Filed: Oct. 13, 2015

(65) Prior Publication Data

US 2017/0101902 A1  Apr. 13, 2017

(51) Int. Cl.
| | |
|---|---|
| F01L 1/34 | (2006.01) |
| F01L 1/08 | (2006.01) |
| F01L 1/047 | (2006.01) |
| F16F 15/20 | (2006.01) |
| F01L 1/14 | (2006.01) |

(52) U.S. Cl.
CPC ............... F01L 1/08 (2013.01); F01L 1/047 (2013.01); F16F 15/20 (2013.01); *F01L 1/146* (2013.01); *F01L 2001/0471* (2013.01); *F01L 2001/0476* (2013.01); *F01L 2001/054* (2013.01); *F01L 2810/03* (2013.01); *F01L 2820/01* (2013.01)

(58) Field of Classification Search
CPC ......... F01L 1/08; F01L 1/047; F01L 2810/03; F01L 1/146; F01L 2001/0471; F01L 2001/0476; F01L 2001/054; F01L 2820/01; F16F 15/20
See application file for complete search history.

(56) References Cited

U.S. PATENT DOCUMENTS 8,381,615 B2 * 2/2013 Vogel .................. B21D 53/845
                                                            123/90.17
2011/0061614 A1 * 3/2011 Marriott ................ F01L 1/053
                                                            123/90.6

FOREIGN PATENT DOCUMENTS

| CN | 104653245 A | 5/2015 |
|---|---|---|
| DE | 102006001769 A1 | 7/2007 |
| FR | 2889569 A1 | 2/2007 |

(Continued)

OTHER PUBLICATIONS

International Search Report and Written Opinion issued in connection with corresponding Application No. PCT/US2016/054335 on Jan. 13, 2017.

*Primary Examiner* — Zelalem Eshete
(74) *Attorney, Agent, or Firm* — Fletcher Yoder, P.C.

(57) ABSTRACT

A system includes a camshaft disposed along an axis from a drive end to a opposite end, and the camshaft includes a plurality of journals configured to support the camshaft and is spaced along the axis. The camshaft includes a plurality of cams spaced along the axis, and is disposed along the camshaft in sets, where each set is disposed between a respective pair of journals of the plurality of journals. The camshaft includes a plurality of mass portions, where each mass portion is disposed between a set of cams and a respective journal. The plurality of mass portions is disposed along the camshaft such that a center of mass of the plurality of mass portions is nearer to the drive end than to the opposite end, and the plurality of mass portions is configured to increase a natural frequency of the shaft.

19 Claims, 4 Drawing Sheets

(56) References Cited

FOREIGN PATENT DOCUMENTS

JP  681899 A  3/1994
WO  2011126815 A2  10/2011

\* cited by examiner

SYSTEM AND METHOD FOR CAMSHAFT VIBRATION CONTROL

BACKGROUND OF THE INVENTION

The subject matter disclosed herein relates to reciprocating engines and, more specifically, to a camshaft of a reciprocating engine.

A reciprocating engine (e.g., an internal combustion engine such as a diesel engine or gas engine) combusts fuel with an oxidant (e.g., air) in a combustion chamber to generate hot combustion gases, which in turn drive a piston (e.g., reciprocating piston) within a cylinder. In particular, the hot combustion gases expand and exert a pressure against the piston that linearly moves the position of the piston from a top portion to a bottom portion of the cylinder during an expansion stroke. The piston converts the pressure exerted by the hot combustion gases (and the piston's linear motion) into a rotating motion (e.g., via a connecting rod and a crankshaft coupled to the piston) that drives one or more loads, for example, an electrical generator. The timing of combustion events affects the control of engine performance, including fuel combustion, engine durability, exhaust emissions, and so forth. Unfortunately, the vibration of larger engines with more cylinders may poorly affect the timing of combustion events.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a camshaft disposed along an axis from a drive end to an opposite end. The camshaft includes a plurality of journals configured to support the camshaft, such that each journal of the plurality of journals is spaced along the axis, a plurality of cams spaced along the axis, such that the plurality of cams is disposed along the camshaft in sets, wherein each set is disposed between a respective pair of journals of the plurality of journals, and a plurality of mass portions. Each mass portion of the plurality of mass portions is disposed between a set of cams of the plurality of cams and a respective journal of the plurality of journals. The plurality of mass portions is disposed along the camshaft such that a center of mass of the plurality of mass portions is nearer to the drive end than to the opposite end, and the plurality of mass portions is configured to increase a natural frequency of the shaft.

In a second embodiment, a system includes a camshaft disposed along an axis from a drive end to an opposite end, where the camshaft comprises a plurality of segments. A first section of the plurality of segments includes a plurality of journals configured to support the camshaft, such that each journal of the plurality of journals is spaced along the axis, a plurality of cams spaced along the axis, such that the plurality of cams is disposed along the camshaft in sets, such that each set is disposed between a respective pair of journals of the plurality of journals, and a plurality of mass portions. Each mass portion of the plurality of mass portions is disposed between a set of cams of the plurality of cams and a respective journal of the plurality of journals. A second segment of the plurality of segments includes a plurality of journal configured to support the camshaft, such that each journal of the plurality of journals is spaced along the axis, a plurality of cams spaced along the axis, such that the plurality of cams is disposed along the camshaft in sets. Each set of camshafts is disposed between a respective pair of journals of the plurality of journals and a plurality of mass portions. Each mass portion of the plurality of mass portions is disposed between a set of cams of the plurality of cams and a respective journal of the plurality of journals. The plurality of mass portions is disposed along the camshaft such that a center of mass of the plurality of mass portions is nearer to the drive end than to the opposite end, and the plurality of mass portions is configured to increase a natural frequency of the shaft.

In a third embodiment, a method includes assembling a camshaft including: coupling a first end of a first camshaft segment to a second drive end of a second camshaft segment along a camshaft axis. The first camshaft segment includes a first plurality of journals spaced along the camshaft axis, a first plurality of cams spaced along the camshaft axis, such that the first plurality of cams is disposed along the camshaft axis in first sets. Each first set is disposed between a respective pair of journals of the first plurality of journals and a first plurality of mass portions. Each mass portion of the first plurality of mass portions is disposed between a first set of cams of the first plurality of cams and a respective journal of the plurality of journals. The second camshaft segment includes a second plurality of journals spaced along the camshaft axis, a second plurality of cams spaced along the camshaft axis, such that the second plurality of cams is disposed along the camshaft axis in second sets. Each second set is disposed between a respective pair of journals of the second plurality of journals. The first plurality of mass portions is disposed along the camshaft such that a center of mass of the first plurality of mass portions is nearer to a first drive end of the first camshaft segment than to a second end of the second camshaft segment. The first plurality of mass portions is configured to increase a natural frequency of the camshaft, the first drive end of the first camshaft segment is opposite the first end, and the second drive end of the second camshaft segment is opposite the second end.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
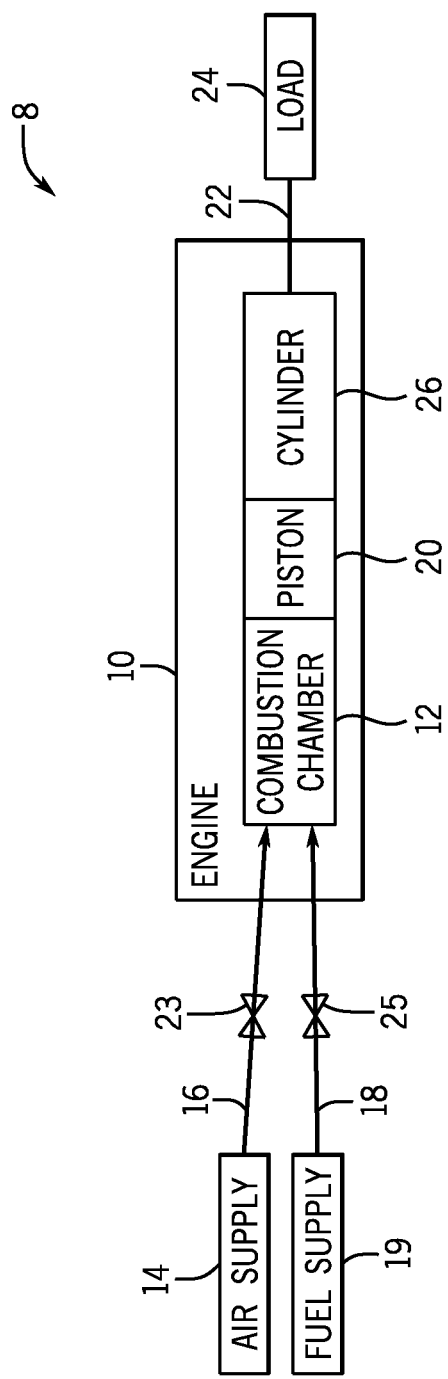
FIG. 1 is a block diagram of an embodiment of an engine driven power generation system, in accordance with aspects of the present disclosure.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Large reciprocating engines (e.g., 6-24 cylinders) may experience challenges with torsional vibration in rotating components of the engine, such as a camshaft. Longer camshafts may tend to reduce the natural torsional frequency associated with the camshaft as the camshaft rotates. Without the features disclosed below, the camshaft may start to experience resonance from operating the engine (e.g., firing pistons) at frequencies near the natural frequency during typical steady-state operation. As such, the difference between the low natural frequency of the camshaft and the excitation frequency (e.g., due to torques induced by the valve trains) of the camshaft may be reduced, resulting in resonance. This resonance issue may result in excessive loading of driven or driving components (e.g., gears, bearings, pumps, etc.) and excessive torsional stress in the camshaft. The resulting resonance issue may also cause uneven distribution of friction that may result in premature wear of the driven or driving components. These conditions may result in failure of such components and/or timing issues with the cylinder assemblies and/or piston firing (e.g., combustion events). The disclosed embodiments may correct (e.g., increase) the difference of the camshaft's natural frequency relative to the excitation frequency, such as by increasing the camshaft's natural frequency. Tuning the camshaft by selectively increasing portions of the diameter of the camshaft may add mass, thereby correcting the resonance issue. Increasing the diameter and/or mass of certain sections of the camshaft may increase the stiffness and the moment of inertia of the camshaft. As such, the associated natural torsional frequency of the camshaft can be modified (e.g., increased). Increasing the diameter and/or mass of certain camshaft segments (e.g., those disposed near a drive end) may be accomplished by disposing a plurality of mass portions along a camshaft segment. The mass portions may extend from or be separate from a journal (e.g., bearing) used to support the camshaft segments and the assembled camshaft itself.

Turning now to the drawings, FIG. 1 illustrates a block diagram of an embodiment of a portion of an engine driven power generation system 8. As described in detail below, the system 8 includes an engine 10 (e.g., a reciprocating internal combustion engine) having one or more combustion chambers 12 (e.g., 1, 2, 3, 4, 5, 6, 7, 8, 10, 12, 14, 16, 18, 20, or more combustion chambers 12). An air supply 14 is configured to provide a pressurized oxidant 16, such as air, oxygen, oxygen-enriched air, oxygen-reduced air, or any combination thereof, to each combustion chamber 12. The combustion chamber 12 is also configured to receive a fuel 18 (e.g., a liquid and/or gaseous fuel) from a fuel supply 19, and a fuel-air mixture ignites and combusts within each combustion chamber 12. The hot pressurized combustion gases cause a piston 20 adjacent to each combustion chamber 12 to move linearly within a cylinder 26 and convert pressure exerted by the gases into a rotating motion, which causes a shaft 22 to rotate. Further, the shaft 22 may be coupled to a load 24, which is powered via rotation of the shaft 22. For example, the load 24 may be any suitable device that may generate power via the rotational output of the system 10, such as an electrical generator. Additionally, although the following discussion refers to air as the oxidant 16, any suitable oxidant may be used with the disclosed embodiments. Similarly, the fuel 18 may be any suitable gaseous or liquid fuel, such as natural gas, associated petroleum gas, propane, biogas, sewage gas, landfill gas, coal mine gas, gasoline, diesel, kerosene, for example. The flow rate of the air supply 14 and the fuel supply 19 may be controlled via an air supply valve 23 and a fuel supply valve 25, respectively.

The system 8 disclosed herein may be adapted for use in stationary applications (e.g., in industrial power generating engines) or in mobile applications (e.g., in cars or aircraft). The engine 10 may be a two-stroke engine, three-stroke engine, four-stroke engine, five-stroke engine, or six-stroke engine. The engine 10 may also include any number of combustion chambers 12, pistons 20, and associated cylinders (e.g., 1-24). For example, in certain embodiments, the system 8 may include a large-scale industrial reciprocating engine having 4, 6, 8, 10, 16, 24 or more pistons 20 reciprocating in cylinders 26. In some such cases, the cylinders 26 and/or the pistons 20 may have a diameter of between approximately 13.5-34 centimeters (cm). In some embodiments, the cylinders and/or the pistons 20 may have a diameter of between approximately 10-40 cm, 15-25 cm, or about 15 cm. The system 10 may generate power ranging from 10 kW to 10 MW. In some embodiments, the engine 10 may operate at less than approximately 1800 revolutions per minute (RPM). In some embodiments, the engine 10 may operate at less than approximately 2000 RPM, 1900 RPM, 1700 RPM, 1600 RPM, 1500 RPM, 1400 RPM, 1300 RPM, 1200 RPM, 1000 RPM, 900 RPM, or 750 RPM. In some embodiments, the engine 10 may operate between approximately 750-2000 RPM, 900-1800 RPM, or 1000-1600 RPM. In some embodiments, the engine 10 may operate at approximately 1800 RPM, 1500 RPM, 1200 RPM, 1000 RPM, or 900 RPM. Exemplary engines 10 may include General Electric Company's Jenbacher Engines (e.g., Jenbacher Type 2, Type 3, Type 4, Type 6 or J920 FleXtra) or Waukesha Engines (e.g., Waukesha VGF, VHP, APG, 275GL), for example.

Figure 2:
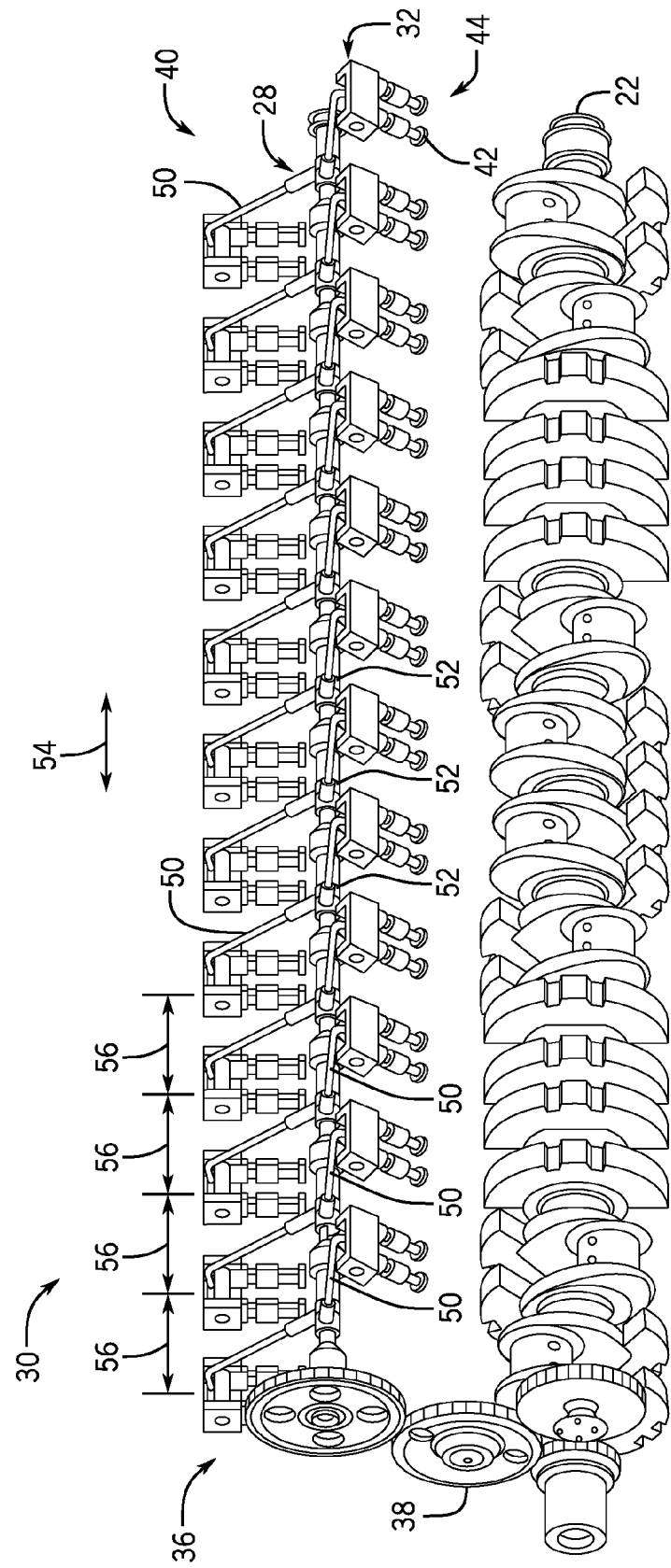
FIG. 2 illustrates a perspective view of a valvetrain system of a reciprocating engine, in accordance with aspects of the present disclosure.

FIG. 2 illustrates a perspective view of a valvetrain system 30 of a reciprocating engine 12, in accordance with aspects of the present disclosure. The camshaft 28 may include a plurality of valve assemblies 32 coupled to the camshaft 28. Though FIG. 2 illustrates the valve assemblies 32 for a reciprocating engine 12, other engine configurations may be used. Each valve assembly 32 may be disposed within a cylinder. A crankshaft 22 translates the reciprocating linear motion of a piston disposed in the cylinder into rotational motion 29. The crankshaft 22 may drive a gear assembly 38. As the piston moves, the crankshaft 22 rotates to power the load 24, as described above with regard to FIG. 1. Each of the valve assemblies 32 may include an intake valve 42 and an exhaust valve 44. The intake valve 42 may control the delivery of air 14 to a combustion chamber within the cylinder. The exhaust valve 44 may control discharge of exhaust from the combustion chamber. In operation, combustion of the fuel 18 with the air 14 in the combustion chamber 12 cause the piston 20 to move in a reciprocating manner (e.g., back and forth) in an axial direction 46 within a cavity of the cylinder, thereby driving the crankshaft 22.

Each valve assembly 32 of the valvetrain system 30 may include either one of the valves 42, 44 that is mechanically coupled to a rocker arm, which may move (e.g., open or close) the valve 42, 44 during operations of the engine 10. A connecting rod 50 may be mechanically coupled to the rocker arm and suitable for connecting the rocker arm to the engine 10. More than one valve assembly 32 may be driven by a cam 52 disposed on the camshaft 28. The camshaft 28 may include various camshaft segments 56 coupled together (e.g., via bolts or other suitable fasteners), particularly for engines with more cylinders 34 (e.g., 9 to 32 or more). The camshaft 28 may include a drive end 36 and an opposite end 40. One or more camshaft segments 56 may be disposed between the drive end 36 and the opposite end 40. For example, the camshaft 28 may include 1, 2, 3, 4, 5, 6, or more camshaft segments 56. The camshaft segments 56 may be assembled as repeating sections or sections which vary in diameter, length, and so forth. Longer camshafts 28 may reduce the natural frequency (e.g., torsional frequency) associated with the camshaft 28. As such, the torsional frequency associated with the camshaft 28 may be affected by a main excitation frequency of the camshaft 28 as each combustion event within the cylinders 34 disposed along the camshaft 28 occurs. This affect may be minimized by modifying a drive end 36 of the camshaft 28 as described in FIG. 3.

Figure 3:
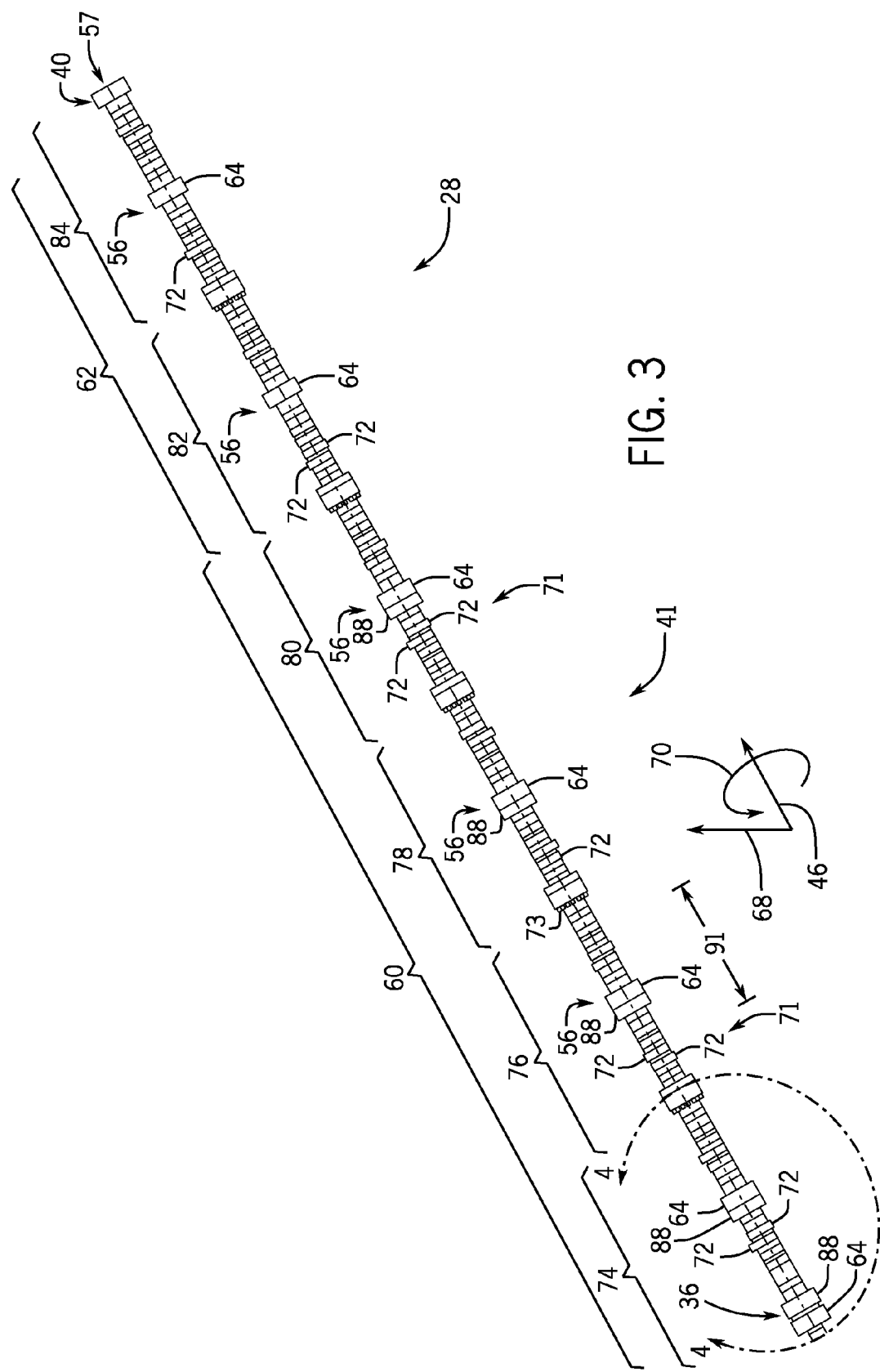
FIG. 3 illustrates a perspective view of the camshaft with a modified drive end.

FIG. 3 illustrates a perspective view of the camshaft 28 with a modified drive end. Though the illustrated embodiment depicts the camshaft 28 having a substantially similar shape from the drive end 36 to the opposite end 40, it should be appreciated the modification of the camshaft 28 as described herein may apply to other camshafts. For example, the described camshaft modification may apply to camshafts 28 with camshaft segments 56 that vary in diameter, circumference, camshaft lengths, and so forth. Selectively modifying the camshaft segments 56 may protect the camshaft 28 from or reduce the impact of the effects of the torsional vibration the camshaft 28 experiences from a longer camshaft length (e.g., due to a larger number of cylinders) and the combustion events when the cylinders are fired.

As described above, the camshaft 28 may be made up of a plurality of camshaft segments 56. The camshaft segments 56 may be substantially similar such that repeating camshaft segments 56 form the longer camshaft 28. In some embodiments, the camshaft segments 56 may include a bore 57 formed along an axis 54 of the camshaft 28. As will be appreciated, utilizing substantially similar (e.g., modular) camshaft segments 56 to form the longer camshaft 28 may enable the camshaft 28 to be selectively modified more easily. The camshaft 28 may include any number of camshaft segments 56 (e.g., 2, 3, 4, 5, 6, 7, 8, or more). In the illustrated embodiment, the camshaft 28 includes six camshaft segments 56 disposed between the drive end 36 and the opposite end 40. Each section may correspond to a respective set of valve assemblies 32 and cylinders 24. For example, an engine 10 with 24 cylinders and 24 valve assemblies may have a camshaft with six sections, where each section corresponds to four cylinders and four valve assemblies.

The camshaft segments 56 may be fixedly coupled together via a connector 73 (e.g., bolts, nuts, fasteners, etc.) such that the camshaft segments 56 collectively form a longer camshaft 28 with multiple sections. The camshaft 28 may include a first section 60 and a second section 62. The first section 60 of the camshaft 28 may include a first plurality of journals 64 (e.g., bearings, etc.) configured to support the camshaft 28 in the axial 46, radial 68, and circumferential 70 directions. The journals 64 may be disposed along the axis 54 of the camshaft 28. The first camshaft section 60 may also include a first plurality of cams 72 spaced along the axis 54. Each cam 72 of the plurality of cams may be disposed in a set 71, such that each set 71 of cams 72 is disposed between a respective pair of the journals 64. The first section 60 of the camshaft 28 may include a majority of the camshaft segments 56 proximate to the drive end 36. For example, the first section 60 of the camshaft 28 may include a first segment 74, a second segment 76, a third segment 78, and a fourth segment 80 of six total camshaft segments 56 of the camshaft 28.

The second section 62 of the camshaft 28 may include a second plurality of journals 64 (e.g., bearings, etc.) configured to support the camshaft 28 in the axial 46, radial 68, and circumferential 70 directions. The journals 64 may be disposed along the axis 54 of the camshaft 28. The second camshaft section 62 may also include a second plurality of cams 72 spaced along the axis 54. Each cam 72 of the plurality of cams may be disposed in a set, such that each set of cams 72 is disposed between a respective pair of the journals 64. The second section 62 may include less than a majority of the camshaft segments 56. For example, the second camshaft section 62 may include a fifth segment 82 and a sixth segment 84 of six total camshaft segments 56. Though any number of the camshaft segments 56 may be modified, selectively modifying a majority of the camshaft segments 56 adjacent the drive end 36 of the camshaft 28 may be beneficial in tuning (e.g., increasing) the natural frequency and stiffness of camshaft 28. Modifying, as discussed below, the camshaft segments 56 nearer the drive end 36 rather than all of the camshaft segments 56 of the camshaft 28 may provide greater increase in natural frequency and stiffness of the camshaft 28. For example, selectively modifying the first four camshaft segments 56 (e.g., the first segment 74, the second segment 76, the third segment 78, and the fourth segment 80) disposed nearer the drive end 36 may increase the natural frequency of the camshaft 28 more effectively than modifying all segments 56 of the camshaft (e.g., the first segment 74, the second segment 76, the third segment 78, the fourth segment 80, the fifth segment 82, and the sixth segment 84).

The drive end 36 of the camshaft 28 may experience a smaller amplitude of oscillation, but may experience greater deflection when compared to the opposite end 40 of the camshaft 28. As such, the camshaft segments 56 disposed nearest the drive end 36 may be tuned (e.g., selectively modified) more easily than the camshaft segments 56 disposed nearest the opposite end 40. Modifying camshaft segments 56 enables the camshaft 28 to be tuned in different camshaft segments 56 to optimize mass and stiffness distribution according to the shape of the critical mode. A goal of the camshaft modification, as described herein, is to increase the frequency margin of the camshaft 28 from main excitation orders of the engine. Selectively modifying the camshaft segments 56 may include varying the diameter 86 of the camshaft 28. As may be appreciated, increasing the size of the diameter 86 provides an increase of the natural torsional frequency of the camshaft 28 by increasing the mass and the moment of inertia of the modified camshaft segment 56. In some embodiments, the increase in natural torsional frequency of the camshaft 28 may be increased by 10 to 50 Hertz (Hz), 15 to 40 Hz, 20 to 30 Hz, and all subranges therebetween. Increasing the size of the diameter 86 (e.g., a body diameter) may also increase variable stiffness and the moment of inertia to tune the camshaft 28 away from damaging torsional resonances during operation. The increase in diameter 86 may result in the camshaft 28 being heavier, thereby increasing the moment of inertia of the camshaft 28.

In some embodiments, selective modification of the camshaft 28 may be accomplished by disposing a plurality of mass portions 88 between the set of cams 72. The plurality of mass portions 88 may be disposed along the first segment 74 of the camshaft 28. The mass portions 88 may be disposed nearer the drive end 36 than the opposite end 40 such that a center of mass 41 of the camshaft 28 is nearer the drive end 36. The mass portions 88 may be disposed along an intermediate portion 90 of the camshaft segments 56. The intermediate portion 91 of the camshaft segment 56 may be described as an inner portion of the camshaft segment 56 where the inner portion covers about 20 to 75 percent, about 30 to 60 percent, or about 40 to 50 percent of the camshaft segment 56, and all subranges therebetween. The modification of the camshaft segments 56 may be further understood with respect to FIG. 4.

Figure 4:
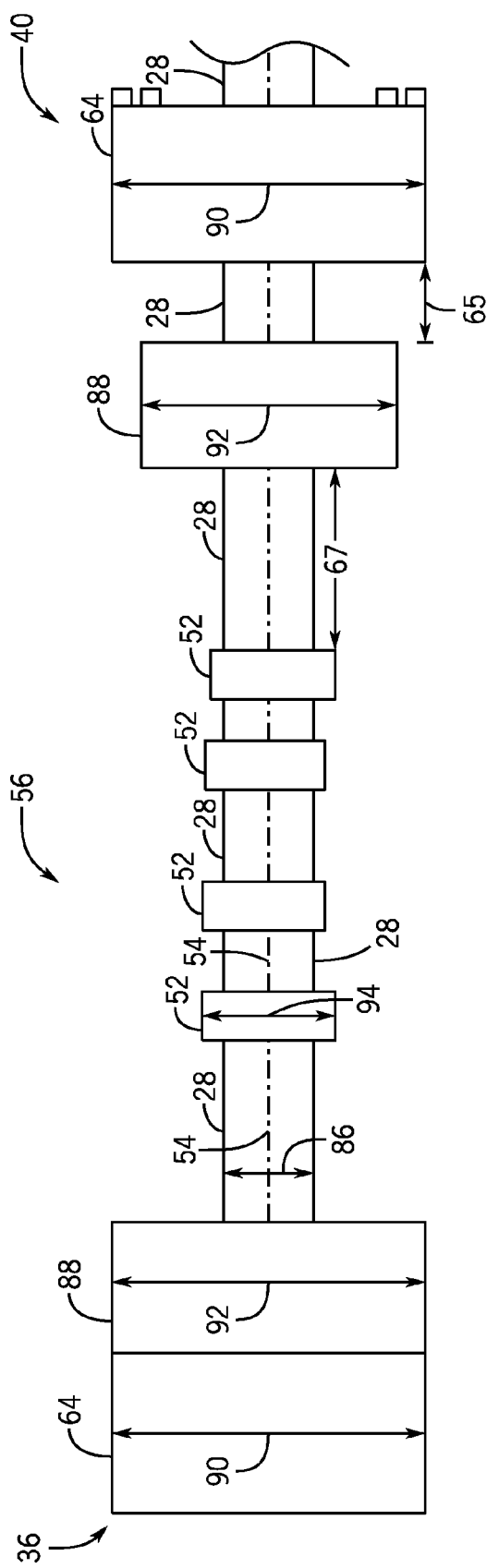
FIG. 4 depicts a profile of the modified drive end along line 4-4 of FIG. 3.

FIG. 4 depicts a profile of the modified drive end 36 along line 4-4 of FIG. 3. As described above, one or more of the camshaft segments 56 may be modified. Modifications to the camshaft segments 56 disposed nearest the drive end 36 may increase the torsional frequency of the camshaft 28 more effectively than modifications to the camshaft segments 56 disposed nearest the opposite end 40 of the camshaft 28. The modifications to the camshaft segments 56 may vary depending on where along the camshaft 28 they are disposed. For example, the camshaft segments 56 disposed nearest the drive end 36 experience a smaller amplitude of oscillation and greater deflection at the drive end 36. The camshaft segments 56 disposed nearest the opposite end 40 may have a smaller moment of inertia than the camshaft segments at the drive end 36. Accordingly, the camshaft segments 56 disposed nearer the opposite end 40 may experience a less deflection when compared to the drive end 36 of the camshaft 28, but may experience a higher amplitude of oscillation. Therefore, selectively modifying the camshaft segments 56 disposed nearest the drive end 36 may tune the camshaft 28 more readily than modifying the camshaft segments 56 disposed nearest the opposite end 40. Selective modification of the camshaft 28 as described herein may include adding more of or larger mass portions 88 to the camshaft segments 56 nearest the drive end 36.

Tuning the camshaft 28 may include coupling a first opposite end 40 of the first section 60 of the camshaft to a second drive end 36 of the second section of the camshaft 62. The first section 60 may include the first plurality of journals 64 disposed along the axis 54 of the camshaft 28. The first section 60 may also include the first plurality of cams 52 disposed between a pair of journals 64. Similarly, the second section 62 may include the second plurality of journals 64 disposed along the axis 54 of the camshaft 28. The second section 62 may also include the second plurality of cams 52 disposed between a pair of journals 64. In some embodiments, the first section 60 may include the plurality of mass portions 88 disposed between the cams 52 and the journals 64. The mass portions 88 may selectively increase the diameter 86 of the camshaft 28. The increase in mass of the camshaft 28 increases the moment of inertia of the camshaft 28 and increases the size of diameter 86 of the camshaft 28. These modifications may increase the natural torsional frequency of the camshaft 28.

Disposing the mass portions 88 along the intermediate section 91 (e.g., portion) of the first section 60 may increase the natural frequency and stiffness of the camshaft segment 56 (e.g., the first section 60). As such, disposing the mass portions 88 along the intermediate section 91 of the first section 60 may reduce the resonance effect naturally created by utilizing longer camshafts 28 for larger engines 10. It should be appreciated the camshaft segments 56 may have other suitable configurations of camshaft assemblies. For example, other camshaft segments 56 (e.g., the first segment 74, the second segment 76, the third segment 78, the fourth segment 80) may be tuned by disposing mass portions at suitable locations along the axis 54 of the camshaft segments 56. In some embodiments, the one or more modified camshaft segments 56 may be alternated (e.g., the first segment 74 and the third segment 78) or otherwise modified. Regardless of which camshaft segments 56 are modified of the first section 60, the mass portions 88 are positioned to move a center of mass of the camshaft 28 disposed along the first section 60 nearer the drive end 36 of the camshaft 28. In some embodiments, the plurality of mass portions 88 may be disposed between an interface of the camshaft segments 56 (e.g., the first camshaft segment 74 and the second camshaft segment 76).

In some embodiments, a mass portion 88 may extend from a journal 64. Additionally, or in the alternative, one or more of the mass portions 88 may be coupled to a respective journal 64. In some embodiments, the one or more of the mass portions 88 may be separate from the adjacent journal 64. When the mass portions 88 are separate from the adjacent journals 64, the distance 65 between the mass portion 88 and the adjacent journal 64 may vary along the axis 54 of the camshaft 28. The distance 65 between the mass portion 88 and the adjacent journal 64 along different camshaft segments 56 may vary within a single camshaft segment 56, or the distance may vary among different camshaft segments 56. The plurality of mass portions 88 may be offset an axial distance 67 from the respective sets of cams 71. The mass portions 88 may be separated by a distance 67 from the cams 52. The distance 67 may vary along different camshaft segments 56 or within the same camshaft segment 56.

As described above, the moment of inertia of the camshaft 28 may be increased by disposing the mass portions 88 with diameters greater than the intermediate portion 91 along the axis 54 of the camshaft 28 where the mass portions 88 are formed from the same or similar material as the camshaft 28. Increasing the diameter 86 of the camshaft 28 increases the mass of the camshaft 28, thereby increasing the moment of inertia. In some embodiments, the increase of the diameter 86 of the intermediate portion 91 may be homogenous. Alternatively, a diameter 90 of the journals 64 may be larger than the diameter 86 of the camshaft 28. For example, the diameter 90 of the journals 64 may be about 1 to 4 times, or 2 to 3 times the size of the diameter 86 of the camshaft 28. The mass portions 88 may have diameter 92 (e.g., mass diameter) which may be less than or equal to the journal diameter 90. For example, the diameter 90 of the journal 64 may be 2 to 3 times the size of the mass diameter 92. Alternatively, the diameter 90 of the journal (e.g., a second diameter) may be equal to the mass diameter 92 (e.g., a third diameter). In some embodiments, the sets of cams 52 may have a cam diameter 94 (e.g., a first diameter) where the cam diameter 94 is smaller than the journal diameter 90.

Technical effects of the invention include modifying a camshaft segment 56 of a reciprocating engine 10 to increase the natural frequency of the camshaft 28 to offset the resonance effect experienced by the camshaft 28 during combustion events. Modifying the camshaft segments may be accomplished by increasing the moment of inertia of the camshaft 28. Increasing the moment of inertia of certain camshaft segments 56 (e.g., those disposed near a drive end 36) may be accomplished by disposing a plurality of mass portions 88 along a camshaft segment 56. The mass portions 88 may extend from or be separate from a journal 64 (e.g., bearing) used to support the camshaft segments 56.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system comprising:
a camshaft disposed along an axis from a drive end to a opposite end, wherein the camshaft comprises:
a plurality sections coupled along the axis, wherein each section of the plurality of sections comprises:
a pair of journals configured to support the camshaft, wherein each journal of the pair of journals is spaced along the axis;
a set of cams spaced along the axis, wherein the set of cams is disposed along the camshaft between a respective pair of journals of the plurality of journals; and
a plurality of mass portions, wherein each mass portion of the plurality of mass portions is disposed between the set of cams and a respective journal of the pair of journals, the plurality of mass portions is disposed along the camshaft such that a center of mass of the plurality of mass portions is nearer to the drive end than to the opposite end, and the plurality of mass portions is configured to increase a natural frequency of the camshaft.

2. The system of claim 1, wherein one or more mass portions of the plurality of mass portions is an extension of the respective journal of the plurality of journals.

3. The system of claim 1, wherein one or more mass portions of the plurality of mass portions is separate from the respective journal of the plurality of journals.

4. The system of claim 1, wherein the camshaft comprises a body having a body diameter, each journal of the pair of journals comprises a journal diameter greater than the body diameter, and each mass portion of the plurality of mass portions comprises a mass diameter less than or equal to the journal diameter.

5. The system of claim 1, wherein each mass portion of the plurality of mass portions is offset an axial distance from the respective set of cams.

6. The system of claim 1, wherein one or more sections of the plurality of sections comprises a bore along the axis.

7. The system of claim 6, wherein the plurality of mass portions is only disposed on a first group of sections of the plurality of sections, wherein the first group of sections is proximate to the drive end, and a remainder second group of sections of the plurality of sections is proximate to the opposite end.

8. The system of claim 1, comprising a reciprocating engine, wherein the reciprocating engine comprises the camshaft.

9. A system comprising:
a camshaft disposed along an axis from a drive end to an opposite end, wherein the camshaft comprises a first section coupled to a second section, the first section is nearer the drive end, and the second section is nearer the opposite end, wherein the first section comprises:
a first plurality of journals configured to support the camshaft, wherein each journal of the plurality of journals is spaced along the axis;
a first plurality of cams spaced along the axis, wherein the plurality of cams is disposed along the camshaft in sets, wherein each set is disposed between a respective pair of journals of the plurality of journals; and
a first plurality of mass portions, wherein each mass portion of the plurality of mass portions is disposed between a set of cams of the plurality of cams and a respective journal of the plurality of journals; and
wherein the second section comprises:
a plurality of journal configured to support the camshaft, wherein each journal of the plurality of journals is spaced along the axis;
a plurality of cams spaced along the axis, wherein the plurality of cams is disposed along the camshaft in sets, wherein each set is disposed between a respective pair of journals of the plurality of journals; and
wherein the first plurality of mass portions is disposed along the camshaft such that a center of mass of the plurality of mass portions is nearer to the drive end than to the opposite end, and the plurality of mass portions is configured to increase a natural frequency of the shaft.

10. The system of claim 9, wherein a first mass portion of the plurality of the mass portions is disposed between the first section and the second section.

11. The system of claim 9, wherein the first and second sets of cams each comprise a first diameter, and the first and second pairs of journals each comprise a second diameter, wherein the second diameter is greater than the first diameter.

12. The system of claim 11, wherein the mass portions each comprise a third diameter, wherein the third diameter equals the second diameter.

13. The system of claim 11, wherein the third diameter is greater than the second diameter.

14. The system of claim 9, wherein the first section comprises a majority of the sections.

15. The system of claim 9, wherein at least one of the mass portions is coupled to at least one of the journal portions.

16. The system of claim 9, comprising a reciprocating engine, wherein the reciprocating engine comprises the camshaft.

17. The system of claim 9, wherein at least one of the mass portions is separate from at least one of the journal portions.

18. A method of assembling a camshaft comprising:
coupling a first end of a first camshaft segment to a second drive end of a second camshaft segment along a camshaft axis, wherein the first camshaft segment comprises:

a first plurality of journals spaced along the camshaft axis;

a first plurality of cams spaced along the camshaft axis, wherein the first plurality of cams is disposed along the camshaft axis in first sets, and each first set is disposed between a respective pair of journals of the first plurality of journals; and a first plurality of mass portions, wherein each mass portion of the first plurality of mass portions is disposed between a first set of cams of the first plurality of cams and a respective journal of the plurality of journals;

wherein the second camshaft segment comprises:

a second plurality of journals spaced along the camshaft axis;

a second plurality of cams spaced along the camshaft axis, wherein the second plurality of cams is disposed along the camshaft axis in second sets, and each second set is disposed between a respective pair of journals of the second plurality of journals;

wherein the first plurality of mass portions is disposed along the camshaft such that a center of mass of the first plurality of mass portions is nearer to a first drive end of the first camshaft segment than to a second end of the second camshaft segment, the first plurality of mass portions is configured to increase a natural frequency of the camshaft, the first drive end of the first camshaft segment is opposite the first end, and the second drive end of the second camshaft segment is opposite the second end.

19. The method of claim 18, comprising coupling first drive end of the first camshaft segment to a drive train of an engine.

* * * * *